US009321037B2

(12) United States Patent
Chabot et al.

(10) Patent No.: US 9,321,037 B2
(45) Date of Patent: Apr. 26, 2016

(54) HYDROPROCESSING CO-CATALYST COMPOSITIONS AND METHODS OF INTRODUCTION THEREOF INTO HYDROPROCESSING UNITS

(71) Applicants: Julie Chabot, Novato, CA (US); Bo Kou, Richmond, CA (US); Alexander Kuperman, Richmond, CA (US)

(72) Inventors: Julie Chabot, Novato, CA (US); Bo Kou, Richmond, CA (US); Alexander Kuperman, Richmond, CA (US)

(73) Assignee: CHEVRON U.S.A., INC., San Ramon, CA (US)

( * ) Notice: Subject to any disclaimer, the term of this patent is extended or adjusted under 35 U.S.C. 154(b) by 373 days.

(21) Appl. No.: 13/715,918

(22) Filed: Dec. 14, 2012

(65) Prior Publication Data

US 2014/0171298 A1  Jun. 19, 2014

(51) Int. Cl.

| | |
|---|---|
| *B01J 8/20* | (2006.01) |
| *B01J 23/78* | (2006.01) |
| *B01J 23/28* | (2006.01) |
| *B01J 23/30* | (2006.01) |
| *B01J 23/75* | (2006.01) |
| *B01J 23/755* | (2006.01) |
| *B01J 35/00* | (2006.01) |
| *B01J 23/85* | (2006.01) |
| *B01J 31/02* | (2006.01) |
| *B01J 35/02* | (2006.01) |
| *B01J 37/00* | (2006.01) |
| *B01J 31/04* | (2006.01) |
| *B01J 31/06* | (2006.01) |
| *C10G 45/08* | (2006.01) |
| *C10G 45/16* | (2006.01) |
| *B01J 37/04* | (2006.01) |
| *B01J 21/02* | (2006.01) |
| *B01J 21/06* | (2006.01) |
| *B01J 21/10* | (2006.01) |
| *B01J 21/12* | (2006.01) |

(52) U.S. Cl.
CPC ............ *B01J 23/78* (2013.01); *B01J 23/28* (2013.01); *B01J 23/30* (2013.01); *B01J 23/75* (2013.01); *B01J 23/755* (2013.01); *B01J 23/85* (2013.01); *B01J 31/0247* (2013.01); *B01J 31/04* (2013.01); *B01J 31/06* (2013.01); *B01J 35/0006* (2013.01); *B01J 35/023* (2013.01); *B01J 37/0036* (2013.01); *C10G 45/08* (2013.01); *C10G 45/16* (2013.01); *B01J 21/02* (2013.01); *B01J 21/06* (2013.01); *B01J 21/10* (2013.01); *B01J 21/12* (2013.01); *B01J 37/04* (2013.01); *C10G 2300/1033* (2013.01); *C10G 2300/202* (2013.01)

(58) Field of Classification Search
None
See application file for complete search history.

(56) References Cited

U.S. PATENT DOCUMENTS

| | | | |
|---|---|---|---|
| 2,914,462 | A | 11/1959 | Hemminger |
| 3,166,493 | A | 1/1965 | Harvey |
| 3,215,617 | A | 11/1965 | Van Driesen et al. |
| 3,380,909 | A | 4/1968 | Lee |
| 3,455,677 | A | 7/1969 | Litz |
| 3,673,303 | A | 6/1972 | Amana |
| 3,817,856 | A | 6/1974 | Aaron et al. |
| 3,903,241 | A | 9/1975 | Stevens et al. |
| 3,994,832 | A | 11/1976 | Antos |
| 4,087,354 | A | 5/1978 | Hessler |
| 4,131,455 | A | 12/1978 | Edwards et al. |
| 4,145,397 | A | 3/1979 | Toida et al. |
| 4,216,118 | A | 8/1980 | Yoshida et al. |
| 4,220,634 | A | 9/1980 | Deschamps et al. |
| 4,259,294 | A | 3/1981 | Van Zijll Langhout et al. |
| 4,382,023 | A | 5/1983 | Mulaskey |
| 4,409,190 | A | 10/1983 | Van Leirsburg |
| 4,432,953 | A | 2/1984 | Hubred et al. |
| 4,440,868 | A | 4/1984 | Hettinger, Jr. et al. |
| 4,485,004 | A | 11/1984 | Fisher et al. |
| 4,500,495 | A | 2/1985 | Hubred et al. |
| 4,523,986 | A | 6/1985 | Seufert |
| 4,541,868 | A | 9/1985 | Lowenhaupt et al. |
| 4,554,138 | A | 11/1985 | Marcantonio |
| 4,592,827 | A | 6/1986 | Galiasso et al. |
| 4,661,265 | A | 4/1987 | Olson et al. |
| 4,684,456 | A | 8/1987 | Van Driesen et al. |
| 4,710,486 | A | 12/1987 | Lopez et al. |
| 4,762,812 | A | 8/1988 | Lopez et al. |
| 4,770,764 | A | 9/1988 | Ohtake et al. |
| 4,801,570 | A | 1/1989 | Young et al. |
| 4,824,821 | A | 4/1989 | Lopez et al. |
| 4,832,925 | A | 5/1989 | Weir et al. |
| 4,853,106 | A | 8/1989 | Grove et al. |

(Continued)

FOREIGN PATENT DOCUMENTS

| | | |
|---|---|---|
| JP | 1986-21731 | 1/1986 |
| JP | 06-228666 | 8/1994 |

OTHER PUBLICATIONS

U.S. Appl. No. 13/331,175, filed Jul. 5, 2012, Nguyen, et al.

(Continued)

*Primary Examiner* — Melvin C Mayes
*Assistant Examiner* — Colette Nguyen
(74) *Attorney, Agent, or Firm* — Parks IP Law LLC; Steve E. Ellinwood

(57) ABSTRACT

A hydroprocessing co-catalyst composition may comprise in an embodiment a first component comprising co-catalyst particles and a liquid carrier, and a second component comprising a dispersant and a dispersant diluent. The co-catalyst particles may be in the micron size range, and the dispersant may promote dispersion of the co-catalyst particles in materials such as the liquid carrier, the dispersant diluent, and combinations thereof. Methods of introducing a hydroprocessing co-catalyst composition into a hydroprocessing system are also disclosed.

15 Claims, No Drawings

(56) References Cited

U.S. PATENT DOCUMENTS

| | | |
|---|---|---|
| 4,861,565 A | 8/1989 | Sefton et al. |
| 4,900,522 A | 2/1990 | Chou et al. |
| 4,943,547 A | 7/1990 | Seamans et al. |
| 4,961,840 A | 10/1990 | Goyal |
| 4,969,988 A | 11/1990 | Jain et al. |
| 4,970,190 A | 11/1990 | Lopez et al. |
| 5,039,392 A | 8/1991 | Bearden et al. |
| 5,041,404 A | 8/1991 | Seamans et al. |
| 5,099,047 A | 3/1992 | Sato et al. |
| 5,162,282 A | 11/1992 | Lopez et al. |
| 5,164,075 A | 11/1992 | Lopez et al. |
| 5,178,749 A | 1/1993 | Lopez et al. |
| 5,279,726 A | 1/1994 | Ward |
| 5,286,691 A | 2/1994 | Harandi et al. |
| 5,298,152 A | 3/1994 | Kramer et al. |
| 5,350,501 A | 9/1994 | Ward |
| 5,371,308 A | 12/1994 | Gosselink et al. |
| 5,374,348 A | 12/1994 | Sears et al. |
| 5,415,849 A | 5/1995 | Toyabe et al. |
| 5,457,258 A | 10/1995 | Hommeltoft et al. |
| 5,484,755 A | 1/1996 | Lopez et al. |
| 5,505,857 A | 4/1996 | Misra et al. |
| 5,527,473 A | 6/1996 | Ackerman |
| 5,871,638 A | 2/1999 | Pradhan et al. |
| 5,914,010 A | 6/1999 | Hood et al. |
| 5,925,238 A | 7/1999 | Duddy et al. |
| 5,935,418 A | 8/1999 | Chakrabarty et al. |
| 5,954,945 A | 9/1999 | Cayton et al. |
| 5,977,192 A | 11/1999 | Howsmon et al. |
| 5,998,328 A | 12/1999 | Dawes et al. |
| 6,030,915 A | 2/2000 | de Boer |
| 6,071,402 A | 6/2000 | Danot et al. |
| 6,090,859 A | 7/2000 | Howsmon et al. |
| 6,139,723 A | 10/2000 | Pelrine et al. |
| 6,156,693 A | 12/2000 | Song et al. |
| 6,156,695 A | 12/2000 | Soled et al. |
| 6,162,350 A | 12/2000 | Soled et al. |
| 6,190,542 B1 | 2/2001 | Comolli et al. |
| 6,241,855 B1 | 6/2001 | Gibson et al. |
| 6,241,874 B1 | 6/2001 | Wallace et al. |
| 6,270,654 B1 | 8/2001 | Colyar et al. |
| 6,270,655 B1 | 8/2001 | Ganguli |
| 6,274,530 B1 | 8/2001 | Cayton et al. |
| 6,277,895 B1 | 8/2001 | Zhou et al. |
| 6,278,034 B1 | 8/2001 | Espinoza et al. |
| 6,291,391 B1 | 9/2001 | MacArthur et al. |
| 6,299,760 B1 | 10/2001 | Soled et al. |
| 6,451,729 B1 | 9/2002 | Song et al. |
| 6,482,315 B1 | 11/2002 | Roberie et al. |
| 6,534,437 B2 | 3/2003 | Eijsbouts et al. |
| 6,554,994 B1 | 4/2003 | Reynolds et al. |
| 6,589,492 B2 | 7/2003 | Matsumoto et al. |
| 6,620,313 B1 | 9/2003 | Demmin et al. |
| 6,630,066 B2 | 10/2003 | Cash et al. |
| 6,635,599 B1 | 10/2003 | Eijsbouts et al. |
| 6,652,738 B2 | 11/2003 | Eijsbouts et al. |
| 6,660,157 B2 | 12/2003 | Que et al. |
| 6,673,732 B2 | 1/2004 | Muhler et al. |
| 6,712,955 B1 | 3/2004 | Hou et al. |
| 6,726,832 B1 | 4/2004 | Baldassari et al. |
| 6,733,564 B1 | 5/2004 | Sahu et al. |
| 6,758,963 B1 | 7/2004 | Hantzer et al. |
| 6,846,403 B2 | 1/2005 | Cheng et al. |
| 6,852,214 B1 | 2/2005 | Chester et al. |
| 6,860,986 B2 | 3/2005 | Timken et al. |
| 6,923,903 B2 | 8/2005 | Chester et al. |
| 7,033,480 B2 | 4/2006 | King |
| 7,067,090 B2 | 6/2006 | Han et al. |
| 7,150,823 B2 | 12/2006 | Mayer et al. |
| 7,179,366 B2 | 2/2007 | Harle et al. |
| 7,182,926 B2 | 2/2007 | Akahoshi |
| 7,214,308 B2 | 5/2007 | Colyar |
| 7,223,713 B2 | 5/2007 | Alonso et al. |
| 7,232,515 B1 | 6/2007 | Demmin et al. |
| 7,255,795 B2 | 8/2007 | Sentimenti et al. |
| 7,297,250 B2 | 11/2007 | Bronicki |
| 7,358,413 B2 | 4/2008 | Stell et al. |
| 7,396,799 B2 | 7/2008 | Chen et al. |
| 7,410,928 B2 | 8/2008 | Chen et al. |
| 7,413,669 B2 | 8/2008 | Gonzalez et al. |
| 7,416,653 B2 | 8/2008 | Wellington et al. |
| 7,449,103 B2 * | 11/2008 | Lott et al. ............... 208/108 |
| 7,452,844 B2 | 11/2008 | Hu et al. |
| 7,544,285 B2 | 6/2009 | Domokos et al. |
| 7,585,812 B2 | 9/2009 | Hu et al. |
| 7,803,267 B2 | 9/2010 | Chester et al. |
| 7,820,579 B2 | 10/2010 | Ginestra et al. |
| 7,906,447 B2 | 3/2011 | McCarthy et al. |
| 2002/0010088 A1 | 1/2002 | Eijsbouts et al. |
| 2002/0012517 A1 | 1/2002 | Ichioka et al. |
| 2002/0125172 A1 | 9/2002 | Que et al. |
| 2002/0153283 A1 | 10/2002 | Chester et al. |
| 2002/0166797 A1 | 11/2002 | Banerjee |
| 2002/0179498 A1 | 12/2002 | Chester et al. |
| 2003/0034275 A1 | 2/2003 | Roberie et al. |
| 2003/0075481 A1 | 4/2003 | Chester et al. |
| 2003/0089636 A1 | 5/2003 | Marchionna et al. |
| 2003/0089639 A1 | 5/2003 | Chester et al. |
| 2003/0102254 A1 | 6/2003 | Eijsbouts et al. |
| 2003/0130118 A1 | 7/2003 | Koyama et al. |
| 2003/0150778 A1 | 8/2003 | Haluska et al. |
| 2004/0029721 A1 | 2/2004 | Wang et al. |
| 2004/0134837 A1 | 7/2004 | Dassori |
| 2004/0163999 A1 | 8/2004 | Plantega et al. |
| 2004/0219082 A1 | 11/2004 | Matjie et al. |
| 2004/0226860 A1 | 11/2004 | Bourges et al. |
| 2004/0237720 A1 | 12/2004 | Moyes et al. |
| 2004/0241066 A1 | 12/2004 | Jasra et al. |
| 2005/0040080 A1 | 2/2005 | Riley et al. |
| 2005/0118081 A1 | 6/2005 | Harris et al. |
| 2005/0145538 A1 | 7/2005 | Wellington et al. |
| 2005/0145543 A1 | 7/2005 | Bhan et al. |
| 2005/0150818 A1 | 7/2005 | Bhan et al. |
| 2005/0155908 A1 | 7/2005 | Bhan et al. |
| 2005/0159295 A1 | 7/2005 | Ginestra et al. |
| 2005/0167320 A1 | 8/2005 | Bhan et al. |
| 2005/0167321 A1 | 8/2005 | Wellington et al. |
| 2005/0167322 A1 | 8/2005 | Wellington et al. |
| 2005/0167323 A1 | 8/2005 | Wellington et al. |
| 2005/0167324 A1 | 8/2005 | Bhan et al. |
| 2005/0167326 A1 | 8/2005 | Bhan et al. |
| 2005/0167327 A1 | 8/2005 | Bhan et al. |
| 2005/0167328 A1 | 8/2005 | Bhan et al. |
| 2005/0167329 A1 | 8/2005 | Bhan et al. |
| 2005/0167330 A1 | 8/2005 | Bhan et al. |
| 2005/0167331 A1 | 8/2005 | Bhan et al. |
| 2005/0167332 A1 | 8/2005 | Bhan et al. |
| 2005/0173298 A1 | 8/2005 | Wellington et al. |
| 2005/0173301 A1 | 8/2005 | Bhan et al. |
| 2005/0173302 A1 | 8/2005 | Bhan et al. |
| 2005/0173303 A1 | 8/2005 | Bhan et al. |
| 2005/0189260 A1 | 9/2005 | Chester et al. |
| 2005/0241992 A1 | 11/2005 | Lott et al. |
| 2005/0241993 A1 | 11/2005 | Lott et al. |
| 2005/0249652 A1 | 11/2005 | Scharifker et al. |
| 2006/0011511 A1 | 1/2006 | Hokari et al. |
| 2006/0054535 A1 | 3/2006 | Chen et al. |
| 2006/0058175 A1 | 3/2006 | Chen et al. |
| 2006/0060501 A1 | 3/2006 | Gauthier et al. |
| 2006/0060502 A1 | 3/2006 | Soled et al. |
| 2006/0060503 A1 | 3/2006 | Soled et al. |
| 2006/0135631 A1 | 6/2006 | Kopponen et al. |
| 2006/0151399 A1 | 7/2006 | Brandts et al. |
| 2006/0157385 A1 | 7/2006 | Montanari et al. |
| 2006/0163115 A1 | 7/2006 | Montanari et al. |
| 2006/0175229 A1 | 8/2006 | Montanari et al. |
| 2006/0186021 A1 | 8/2006 | Marchionna et al. |
| 2006/0201854 A1 | 9/2006 | Lott et al. |
| 2006/0207917 A1 | 9/2006 | Domokos et al. |
| 2006/0231465 A1 | 10/2006 | Bhan et al. |
| 2006/0258531 A1 | 11/2006 | Koyama et al. |
| 2006/0272982 A1 | 12/2006 | Montanari et al. |
| 2006/0289340 A1 | 12/2006 | Brownscombe et al. |
| 2007/0000808 A1 | 1/2007 | Bhan et al. |

(56) References Cited

U.S. PATENT DOCUMENTS

| | | |
|---|---|---|
| 2007/0000810 A1 | 1/2007 | Bhan et al. |
| 2007/0007168 A1 | 1/2007 | Zhao et al. |
| 2007/0012595 A1 | 1/2007 | Brownscombe et al. |
| 2007/0025899 A1 | 2/2007 | Marcantonio |
| 2007/0045156 A1 | 3/2007 | Khadzhiev et al. |
| 2007/0056881 A1 | 3/2007 | Berkowitz et al. |
| 2007/0084754 A1 | 4/2007 | Soled et al. |
| 2007/0090023 A1 | 4/2007 | Soled et al. |
| 2007/0090024 A1 | 4/2007 | Soled et al. |
| 2007/0098609 A1 | 5/2007 | McConnell |
| 2007/0158236 A1 | 7/2007 | Zhou et al. |
| 2007/0158238 A1 | 7/2007 | Wu et al. |
| 2007/0161505 A1 | 7/2007 | Pereira-Aimao et al. |
| 2007/0238607 A1 | 10/2007 | Alonso et al. |
| 2007/0284285 A1 | 12/2007 | Stepanik et al. |
| 2007/0295641 A1 | 12/2007 | Brownscombe et al. |
| 2007/0295645 A1 | 12/2007 | Brownscombe et al. |
| 2007/0295646 A1 | 12/2007 | Bhan et al. |
| 2007/0295647 A1 | 12/2007 | Brownscombe et al. |
| 2008/0083650 A1 | 4/2008 | Bhan et al. |
| 2008/0083652 A1 | 4/2008 | Morel et al. |
| 2008/0083655 A1 | 4/2008 | Bhan et al. |
| 2008/0085225 A1 | 4/2008 | Bhan et al. |
| 2008/0087575 A1 | 4/2008 | Bhan et al. |
| 2008/0087578 A1 | 4/2008 | Bhan et al. |
| 2008/0099371 A1 | 5/2008 | McCoy et al. |
| 2008/0099373 A1 | 5/2008 | Hokari et al. |
| 2008/0099377 A1 | 5/2008 | He et al. |
| 2009/0005520 A1 | 1/2009 | Kiss et al. |
| 2009/0032436 A1 | 2/2009 | Takahashi et al. |
| 2009/0101574 A1 | 4/2009 | Zubot et al. |
| 2009/0107881 A1 | 4/2009 | Lott et al. |
| 2009/0137731 A1 | 5/2009 | Sekiyama et al. |
| 2009/0139715 A1 | 6/2009 | Choi |
| 2009/0139902 A1 | 6/2009 | Kressmann et al. |
| 2009/0152165 A1 | 6/2009 | Etter |
| 2009/0258779 A1 | 10/2009 | McCarthy et al. |
| 2009/0261019 A1 | 10/2009 | McCarthy et al. |
| 2010/0133148 A1 | 6/2010 | Timmler et al. |
| 2010/0170827 A1 | 7/2010 | Etter |
| 2010/0230324 A1 | 9/2010 | Al-Alloush et al. |
| 2011/0139677 A1* | 6/2011 | Bellussi et al. .............. 208/44 |
| 2012/0152805 A1 | 6/2012 | Chabot et al. |

OTHER PUBLICATIONS

U.S. Appl. No. 13/331,207, filed Jul. 5, 2012, Mironov, et al.
U.S. Appl. No. 13/331,274, filed Jul. 5, 2012, Yang, et al.
U.S. Appl. No. 13/331,305, filed Jul. 5, 2012, Maris, et al.
U.S. Appl. No. 13/331,341, filed Jul. 5, 2012, Mironov, et al.
U.S. Appl. No. 13/331,372, filed Jul. 5, 2012, Mironov, et al.
U.S. Appl. No. 13/331,479, filed Jul. 5, 2012, Jiao, et al.
U.S. Appl. No. 13/331,630, filed Jul. 5, 2012, Nguyen, et al.
U.S. Appl. No. 13/331,660, filed Jul. 5, 2012, Nguyen, et al.
U.S. Appl. No. 13/331,690, filed Jul. 5, 2012, Mironov, et al.
U.S. Appl. No. 13/331,704, filed Jul. 5, 2012, Nguyen, et al.
U.S. Appl. No. 13/331,725, filed Jul. 5, 2012, Yang, et al.
Pecoraro et al., Hydrodesulfurization Catalysis by Transition Metal Sulfides, Journal of Catalysis (1981) 67, 430-445.
Barnes et al., A review of zinc dialkyldithiophosphates (ZDDPS): characterization and role in the lubricating oil, Tribology International 34 (2001) 389-395.
Panariti et al., Petroleum residue upgrading with dispersed catalysts Part I. Catalysts activity and selectivity. Applied Catalysis A; General 204 (2000) 203-213.
Chadha et al., Iron sulfide Catalysts for Coal Liquefaction Prepared Using a Micellar Technique Ind. Eng. Chem Res 1996. 35. 2916-2919.
Brown et al., Nickel, Cadium and Lead Sulfides as Catalysts in the Vapor Phase Reduction of Nitrobenzene, Laboratory of Physical Chemistry, Indiana University, Jul. 29, 1938.
Le et al., Solution Synthesis of the unsupported Ni-W sulfide hytrotreating catalysts, Catalysis Today 130 (2008) 24-31.
Thompson et al., Thermal decomposition of sulfur compounds. I. 2-Methyl-2-propanethiol, Bureau of Mines, Petroleum and Oil-Shale Experiment Station, Nov. 19, 1951.
Ancheyta et al., Hydroprocessing of heavy petroleum feeds: tutorial, (2005) Catalysis today 109, 3-15.
Rana et al., A review of recent advances on process technologies for upgrading of heavy oils and residue by Fuel 86 (2007) 1216-1231.
S. Zhang et al., A Review of Slurry-Phase Hydrocracking Heavy Oil Technology, Sep. 15, 2007—Energy Fuels, 2007, 21 (6), pp. 3057-3062.
Liu et al, Reactivity and Composition of Dispersed Ni Catalyst for Slurry-Phase Residue Hydrocracking, 2010, Energy Fuels, 24 (3), pp. 1958-1962.
Liu et al, Role of Dispersed Ni Catalyst Sulfurization in Hydrocracking of Residue from Karamay, 2008, Energy Fuels, 22 (6), pp. 4165-4169.
Liu et al, Study on a Water-Soluble Catalyst for Slurry-Phase Hydrocracking of an Atmospheric Residue, 2009, Energy Fuels, 23 (2), pp. 958-961.
S. Eijsbouts et al., Unsupported transition metal sulfide catalysts: From fundamentals to industrial application, Apr. 16, 2007, Applied Catalysis A: General vol. 322, pp. 58-66.
PCT International Search Report and Written Opinion, International Application No. PCT/US2013/068957 dated Mar. 21, 2014.
Database WPI, Week 198301, Thomson Scientific, London, GB; AN 1983-01487K XP002721318, & JP S57 190080 A (Chiyoda Chem Eng Constr Co) Nov. 22, 1982 abstract.

* cited by examiner

HYDROPROCESSING CO-CATALYST COMPOSITIONS AND METHODS OF INTRODUCTION THEREOF INTO HYDROPROCESSING UNITS

TECHNICAL FIELD

The present invention relates to hydroprocessing co-catalyst compositions and methods of introduction thereof into hydroprocessing units.

BACKGROUND

Heavy feedstocks, such as vacuum gas oils and residuum, contain relatively high concentrations of S-, N-, O-, and polynuclear aromatic containing compounds, as well as complex Ni- and V-containing compounds and asphaltenes. As a result, heavy oil is particularly difficult to upgrade in refinery operations. Metals contained in the oil tend to rapidly deactivate catalysts with which they come in contact during the upgrading process. In addition, sulfur and nitrogen are difficult to remove to the extent necessary for further processing of the upgraded products from heavy oil processing.

Furthermore, heavy oil components thermally crack during processing to form free radicals, which quickly combine to make sediment and coke precursors unless suppressed by active catalysis. During conventional hydroprocessing of heavy oils, high molecular weight coke precursors and contaminants that are deposited on catalysts quickly reduce catalytic activity.

One type of conventional heavy oil processing uses an ebullated bed system, in which the catalyst is maintained in a fluidized state within the reaction zone. At periodic intervals, a portion of the fluidized bed of catalyst, along with a small portion of fluidizing liquid, is removed from the system. A comparable amount of catalyst is added to the system to maintain a constant quantity of catalyst in the system at any one time.

In conventional heavy oil upgrading, e.g., using an ebullated bed system that relies solely on a conventional pelletized hydroprocessing catalyst, poorly converted or unconverted feed may precipitate as sediment or sludge. Sediment can then plug equipment leading to shorter runtime and/or operational issues, as well as poor product quality. The formation of sediment or sludge typically increases with conversion and feed difficulty. For this reason, the conversion or ability to process a flexible array of feeds is limited in these units.

Thus, there is a need for improved hydroprocessing catalyst systems that are more efficient, permit an increase in conversion and/or the use of a wider range of feedstocks in a cost-effective manner, as compared with the prior art. There is a further need for methods of introducing a co-catalyst into a hydroprocessing unit.

SUMMARY

One embodiment of the invention is a hydroprocessing co-catalyst composition comprising a liquid carrier comprising oil and co-catalyst particles in admixture with the liquid carrier, wherein the co-catalyst particles are hydrophilic and have a mean particle size between about 2 microns and 100 microns.

Another embodiment of the invention is a hydroprocessing co-catalyst composition comprising co-catalyst particles having a mean particle size between about 2 microns and 100 microns, and a liquid carrier in admixture with the co-catalyst particles, wherein the composition comprises from about 5 wt. % to 50 wt. % of the co-catalyst particles, and the liquid carrier comprises oil.

A further embodiment of the invention is a hydroprocessing co-catalyst composition comprising a liquid carrier comprising oil having a boiling range from about 350° F. to 1125° F., and co-catalyst particles having a mean particle size between about 4 microns and 40 microns; wherein the composition comprises from about 5 wt. % to 50 wt. % of the co-catalyst particles and the co-catalyst particles comprise a support comprising a material selected from alumina, aluminosilicates, silica, boria, magnesia, titania, and combinations thereof.

In yet another embodiment, the invention is a hydroprocessing co-catalyst comprising a composition A comprising a liquid carrier and co-catalyst particles having a mean particle size between about 2 microns and 100 microns, and a composition B comprising a dispersant and a dispersant diluent.

In still a further embodiment, the invention is a hydroprocessing co-catalyst comprising a liquid carrier, co-catalyst particles having a mean particle size between about 2 microns and 100 microns, a dispersant, and a dispersant diluent, wherein the hydroprocessing co-catalyst comprises from about 3 wt. % to 50 wt. % of the co-catalyst particles.

In yet a further embodiment, the invention is a hydroprocessing co-catalyst prepared by a method comprising the steps of providing a composition A comprising co-catalyst particles and a liquid carrier, providing a composition B comprising a dispersant and a dispersant diluent, and combining composition A with composition B to provide a suspension of the co-catalyst particles.

In another embodiment, the invention comprises a method of introducing co-catalyst particles into a hydroprocessing system, the method comprising providing a composition A comprising the co-catalyst particles and a liquid carrier; providing a composition B comprising a dispersant and a dispersant diluent; combining composition B with composition A to form a composition C, wherein composition C comprises a suspension of the co-catalyst particles; and after the combining step, contacting the co-catalyst particles with a hydrocarbon feed of the hydroprocessing system.

In a further embodiment the invention is a method of introducing co-catalyst particles into a hydroprocessing system, the method comprising providing a composition A comprising the co-catalyst particles and a liquid carrier, wherein the co-catalyst particles have a mean particle size between about 2 microns and 100 microns, and the liquid carrier comprises oil; providing a composition B comprising a dispersant and a dispersant diluent; combining composition A with composition B to form a composition C; and contacting composition C with a hydrocarbon feed of the hydroprocessing system.

In yet another embodiment the invention is a method of introducing co-catalyst particles into a hydroprocessing system, the method comprising providing a composition A comprising the co-catalyst particles and a liquid carrier; providing a composition B comprising a dispersant and a dispersant diluent; combining composition B with composition A to form a composition C, wherein composition C comprises a suspension of the co-catalyst particles; and contacting composition C with a hydrocarbon feed of the hydroprocessing system such that the co-catalyst particles are entrained with the hydrocarbon feed within the hydroprocessing system. The co-catalyst particles may comprise a support comprising a material selected from alumina, aluminosilicates, silica, boria, magnesia, titania, and combinations thereof, and the co-catalyst particles may have a mean particle size between about 2 microns and 100 microns.

As used herein, the terms "comprising" and "comprises" mean the inclusion of named elements or steps that are identified following those terms, but not necessarily excluding other unnamed elements or steps.

DETAILED DESCRIPTION

The upgrading of residuum and other heavy feedstocks in hydroprocessing units is an important process in petroleum refining for producing higher value products. One type of heavy oil hydroprocessing unit uses an ebullated bed system, in which the catalyst is maintained in a fluidized state within the reaction zone.

An ebullated bed heavy oil processing system that employs a dual catalyst system for heavy oil hydroprocessing is disclosed, for example, in commonly assigned co-pending U.S. patent application Ser. No. 13/331,479, Hydroprocessing catalysts and methods for making thereof, filed Dec. 20, 2011, the disclosure of which is incorporated by reference herein in its entirety.

Disclosed herein are new co-catalyst compositions, which greatly augment the catalytic activity of conventional pellet hydroprocessing catalysts to enhance the performance of hydroprocessing units, such as LC-Fining and H-Oil ebullated bed units, for processing heavy oil feedstocks. In contrast to the prior art, micron-sized solid particles of co-catalyst may be suspended in, and move with, the residuum feed stream, such that the co-catalyst particles may percolate not only through the ebullated bed reaction zone, but also throughout the hydroprocessing unit. Because particles of the co-catalyst disclosed herein can migrate with the feed stream through the hydroprocessing unit, the co-catalyst provides substantial additional catalytic activity to enhance residuum conversion, while minimizing the formation of undesirable sediment or sludge.

In addition, the co-catalyst particles provide additional surface area and pore volume to adsorb contaminants from the residuum feed, resulting in reduced aging of the ebullated bed portion of the hydroprocessing catalyst system and a much longer runtime for the hydroprocessing unit.

Accordingly, the addition of the co-catalyst to an ebullated bed hydroprocessing unit allows for improved operation, including increased heavy oil feedstock conversion, and/or the ability to process more difficult (e.g., heavier and/or more contaminated) feeds.

In an embodiment, the performance of the co-catalyst, e.g., in an ebullated bed hydroprocessing unit, may be increased by achieving good dispersion of the micron-sized solid co-catalyst particles into the hydrocarbon feed (e.g., residuum). Such dispersion of the co-catalyst particles in the feed may be enabled not only by various chemical and physical attributes of the co-catalyst composition, but also by novel methods and approaches, as disclosed herein, for introducing the co-catalyst into the hydroprocessing unit.

In an embodiment, the co-catalyst composition may be miscible with a catalyst introduction diluent comprising a hydrocarbonaceous oil, and the catalyst introduction diluent may be combined with the co-catalyst composition before introducing the diluent/co-catalyst mixture into the residuum feed. In another embodiment, the co-catalyst composition may be miscible with the residuum feed itself. In an embodiment, compositions as disclosed herein may be safely and conveniently handled and transported.

Therefore, the co-catalyst compositions as provided herein provide many advantages for heavy oil hydroprocessing as compared with the prior art, including the major economic advantage of enhancing the conversion and/or allowing for more difficult feedstocks to be processed without the typical increase in sediment or sludge make associated with such more severe operation.

As used herein, "heavy oil" feed or feedstock refers to heavy and ultra-heavy crudes, including but not limited to resids, coals, bitumen, tar sands, oils obtained from the thermo-decomposition of waste products, polymers, biomasses, oils deriving from coke and oil shales, and the like. Heavy oil feedstock may be liquid, semi-solid, and/or solid. Examples of heavy oil feedstock include but are not limited to Canada Tar sands, vacuum resid from Brazilian Santos and Campos basins, Egyptian Gulf of Suez, Chad, Venezuelan Zulia, Malaysia, and Indonesia Sumatra. Other examples of heavy oil feedstock include residuum left over from refinery processes, including "bottom of the barrel" and "residuum" (or "resid"), atmospheric tower bottoms, which have a boiling point of at least 650° F. (343° C.), or vacuum tower bottoms, which have a boiling point of at least 975° F. (524° C.), or "resid pitch" and "vacuum residue" which have a boiling point of 975° F. (524° C.) or greater.

Co-Catalyst Compositions for Hydroprocessing

In an embodiment, a hydroprocessing co-catalyst composition may comprise a first component comprising co-catalyst particles and a second component comprising a dispersant. Herein, the first component may be referred to as Composition A, and the second component may be referred to as Composition B.

i) Composition A

In an embodiment we provide a Composition A, which may comprise a liquid carrier and co-catalyst particles. The co-catalyst particles may be in admixture with the liquid carrier. In an embodiment, the liquid carrier may comprise oil. Such oil may comprise, for example, petroleum derived oil. In an embodiment, oil comprising the liquid carrier may have a boiling range from about 350° F. to 1125° F., or from about 550° F. to 1100° F., or from about 550° F. to 950° F. As a non-limiting example, the liquid carrier may comprise a material selected from vacuum gas oil, light vacuum gas oil, heavy vacuum gas oil, lube oil base stock, heavy diesel, and combinations thereof.

In an embodiment, the co-catalyst particles may be hydrophilic. The co-catalyst particles may comprise a support. The support may comprise a material selected from alumina, aluminosilicates, silica, as well as other refractory inorganic oxides, including boria, magnesia, titania, and the like and combinations thereof. The co-catalyst support of the present invention can be manufactured by any conventional techniques. In an embodiment, the co-catalyst particles may further comprise one or more metal components. In an embodiment, the support or base may contain catalytic metals, in particular metals from Group VIB of the Periodic Table, including molybdenum and/or tungsten, and/or from Group VIII of the Periodic Table, in particular nickel and/or cobalt. Catalytic metals may be placed onto the support by conventional techniques, including comulling, impregnation, and the like.

In an embodiment, the co-catalyst particles may be synthesized, ground or milled to achieve co-catalyst particles having a particle size in the range from about 1 micron (μm) to 100 microns, or from about 2 microns to 60 microns, or from about 2 microns to 30 microns. In another embodiment, the co-catalyst particles may have a mean particle size between about 2 microns and 100 microns, or between about 4 microns and 40 microns, or between about 4 microns and 30 microns.

In an embodiment, the co-catalyst particles may be suspended in the liquid carrier. In an embodiment, the co-catalyst particles may be suspensible in the liquid carrier in the absence of an extrinsic dispersant. In an embodiment, a liquid carrier may itself contain one or more intrinsic dispersive agents that promote dispersion of the co-catalyst particles in the liquid carrier, such that the liquid carrier is inherently capable of suspending the co-catalyst particles therein without the addition of an extrinsic dispersant to the liquid carrier or to the co-catalyst particles.

In an embodiment, Composition A may comprise from about 5 wt. % to 50 wt. % of the co-catalyst particles, in another embodiment from about 10 wt. % to 40 wt. %, or in a further embodiment from about 15 wt. % to 30 wt. %. In an embodiment, Composition A may comprise from about 50 wt. % to 95 wt. % of the liquid carrier, or from about 60 wt. % to 90 wt. %, or from about 70 wt. % to 85 wt. %.

In an embodiment, the co-catalyst particles may be synthesized or prepared, e.g., by grinding, milling, and the like, using techniques and equipment known in the art, including but not limited to: hammer mill, roller mill, ball mill, jet mill, attrition mill, grinding mill, media agitation mill, and the like, or utilizing synthesis techniques known in the art, including precipitation, atomization, gelling and the like. The co-catalyst particles may be sorted to provide suitable size distributions, e.g., according to a particular requirement or application of a co-catalyst composition.

In an embodiment, Composition A may have a viscosity, at about 70° F., in the range from about 1000 centipoise to 5000 centipoise, in another embodiment from about 1500 centipoise to 4000 centipoise, or in a further embodiment from about 2000 centipoise to 3500 centipoise.

ii) Composition B

In an embodiment, Composition B may comprise a dispersant and a dispersant diluent. In an embodiment, the dispersant may be in admixture with the dispersant diluent. As an example, the dispersant may comprise one or more components that are capable of promoting dispersion of co-catalyst particles in a lipophilic liquid. Such component(s) may comprise, for example, surface active materials, such as non-ionic, anionic, cationic, or amphoteric surfactants.

In an embodiment, the dispersant may be added to the dispersant diluent in an amount such that Composition B may comprise from about 10 wt. % to 95 wt. % of the dispersant, or from about 20 wt. % to 80 wt. %, or from about 30 wt. % to 70 wt. %. In one embodiment, the dispersant may be in the liquid state over a broad temperature range, for example, from about 65° F. to 500° F., or from about 70° F. to 350° F.

In an embodiment, the dispersant may comprise a plurality of components. In an embodiment, the dispersant may comprise polyisobutylene succinimide. In an embodiment, the dispersant may further comprise a material selected from carboxylic acids, dicarboxylic acids, and combinations thereof. In one embodiment, the dispersant may comprise polyisobutylene succinimide and a carboxylic acid such as oleic acid. In a sub-embodiment, Composition B may comprise from about 10 wt. % to 30 wt. % of polyisobutylene succinimide and from about 30 wt. % to 65 wt. % of oleic acid.

In an embodiment, the dispersant diluent may comprise oil. In an embodiment, oil comprising the dispersant diluent may have a boiling range from about 350° F. to 1125° F., or from about 550° F. to 1100° F., or from about 550° F. to 950° F. As a non-limiting example, the dispersant diluent may comprise a material selected from vacuum gas oil, light vacuum gas oil, heavy vacuum gas oil, lube oil base stock, heavy diesel, and combinations thereof.

iii) Composition C

In another embodiment we provide a Composition C, which may comprise a hydroprocessing co-catalyst composition for introduction or incorporation into a hydroprocessing system. In an embodiment, Composition C may be used, for example, as an adjunct to a conventional catalyst in a hydroprocessing (e.g., ebullated bed) system for hydroprocessing a heavy hydrocarbon feed.

Composition C may comprise Composition A (supra) and Composition B (supra). In an embodiment, Composition A and Composition B may be provided in separate containers or vessels. As an example, Composition A may be provided, or contained, in a first vessel, and Composition B may be provided, or contained, in a second vessel. In another embodiment, Composition C may comprise Composition A in admixture with Composition B.

Composition A may comprise a liquid carrier and co-catalyst particles, as described hereinabove. Composition B may comprise a dispersant and a dispersant diluent, also as described hereinabove. Composition C may be prepared by combining Composition A with Composition B. In an embodiment, Composition A and Composition B may be combined at a Composition A/Composition B volume ratio in the range from about 1:20 to 60:1, or from about 1:10 to 50:1, or from about 1:5 to 45:1, to provide Composition C.

In an embodiment, the liquid carrier of Composition A may be miscible with the dispersant diluent of Composition B to form a single phase homogeneous liquid.

In another embodiment, Composition C may be prepared by separately combining one or more dispersant components with Composition A. As an example, one or more materials selected from polyisobutylene succinimide, carboxylic acids, and dicarboxylic acids, may be added separately to Composition A.

Composition C may comprise a suspension of the co-catalyst particles dispersed in a mixture of the liquid carrier and the dispersant diluent. In an embodiment, Composition C may comprise a slurry. Composition C may have a viscosity, at a temperature of about 70° F., in the range from about 100 centipoise to 3000 centipoise, or from about 150 centipoise to 2000 centipoise, or from about 200 centipoise to 1000 centipoise. In an embodiment, each of the liquid carrier and the dispersant diluent may comprise oil.

In an embodiment, the co-catalyst particles may comprise a support. The support may comprise a material selected from alumina, aluminosilicates, silica, as well as other refractory inorganic oxides, including boria, magnesia, titania, and the like, and combinations thereof. The co-catalyst support of the present invention can be manufactured by any conventional techniques. In an embodiment, the co-catalyst particles may further comprise one or more active metal components. In an embodiment, the support or base may contain catalytic metals, in particular metals from Group VIB of the Periodic Table, including molybdenum and/or tungsten, and/or from Group III of the periodic Table, in particular nickel and/or cobalt. Catalytic metals may be placed onto the support by conventional techniques, including comulling, impregnation, and the like.

In an embodiment, the co-catalyst particles may have a particle size in the range from about 1 micron (am) to 100 microns, or from about 2 microns to 60 microns, or from about 2 microns to 30 microns. In another embodiment, the co-catalyst particles may have a mean particle size between about 2 microns and 100 microns, or between about 4 microns and 40 microns, or between about 4 microns and 30 microns. In an embodiment, Composition C may comprise from about 3 wt. % to 50 wt. % of the co-catalyst particles, or from about 5 wt. % to 40 wt. %, or from about 10 wt. % to 30 wt. %.

The dispersant may comprise polyisobutylene succinimide. In an embodiment, the dispersant may comprise a plurality of components. In an embodiment, the dispersant may comprise a material selected from carboxylic acids, dicarboxylic acids, and combinations thereof. In a sub-embodiment, the dispersant may comprise polyisobutylene succinimide and oleic acid.

In an embodiment, the dispersant diluent may comprise oil. In an embodiment, oil comprising the dispersant diluent may have a boiling range from about 350° F. to 1125° F., or from about 550° F. to 1100° F., or from about 550° F. to 950° F. As a non-limiting example, the dispersant diluent may comprise a material selected from vacuum gas oil, light vacuum gas oil, heavy vacuum gas oil, lube oil base stock, heavy diesel, and combinations thereof.

In an embodiment, the dispersant diluent may be miscible with the liquid carrier to form a single phase homogeneous liquid. In an embodiment, the dispersant diluent may comprise a first oil, and the liquid carrier may comprise a second oil. The first oil and the second oil may be the same or different. In another embodiment, each of the first oil and the second oil may comprise vacuum gas oil or lube oil base stock.

In another embodiment, Composition C may comprise co-catalyst particles, a liquid carrier, a dispersant, and a dispersant diluent. The liquid carrier may be miscible with the dispersant diluent to form a single phase homogeneous liquid, and Composition C may comprise a suspension of the co-catalyst particles dispersed in the homogeneous liquid. In an embodiment, each of the liquid carrier and the dispersant diluent may comprise oil.

In an embodiment, Composition C may comprise from about 3 wt. % to 50 wt. % of the co-catalyst particles, or from about 5 wt. % to 40 wt. %, or from about 10 wt. % to 30 wt. %. In an embodiment, the co-catalyst particles may have a particle size in the range from about 1 micron (μm) to 100 microns, or from about 2 microns to 60 microns, or from about 2 microns to 30 microns. In another embodiment, the co-catalyst particles may have a mean particle size between about 2 microns and 100 microns, or between about 4 microns and 40 microns, or between about 4 microns and 30 microns.

In an embodiment, the co-catalyst particles may comprise a support. The support may comprise a material selected from alumina, aluminosilicates, silica, as well as other refractory inorganic oxides, including boria, magnesia, titania, and the like and combinations thereof. The co-catalyst support of the present invention can be manufactured by any conventional techniques.

In another embodiment a hydroprocessing co-catalyst composition, such as Composition C, may be prepared by a method comprising the steps of: i) providing a Composition A comprising co-catalyst particles and a liquid carrier, ii) providing a Composition B comprising a dispersant and a dispersant diluent; and iii) combining Composition A with Composition B to provide a suspension of the co-catalyst particles. In an embodiment, step i) may comprise combining the co-catalyst particles with the liquid carrier to provide a suspension of the co-catalyst in the liquid carrier.

In an embodiment, Composition C may comprise from about 3 wt. % to 50 wt. % of the co-catalyst particles, or from about 5 wt. % to 40 wt. %, or from about 10 wt. % to 30 wt. %. In an embodiment, Composition C may comprise from about 50 wt. % to 90 wt. % of the liquid carrier, or from about 60 wt. % to 85 wt. %, or from about 65 wt. % to 80 wt. %.

In an embodiment, the co-catalyst particles may have a particle size in the range from about 1 micron (am) to 100 microns, or from about 2 microns to 60 microns, or from about 2 microns to 30 microns. In another embodiment, the co-catalyst particles may have a mean particle size between about 2 microns and 100 microns, or between about 4 microns and 40 microns, or between about 4 microns and 30 microns.

In an embodiment, the co-catalyst particles may be hydrophilic. In an embodiment, the co-catalyst particles may comprise a support. The support may comprise a material selected from alumina, aluminosilicates, silica, as well as other refractory inorganic oxides, including boria, magnesia, titania, and the like and combinations thereof. The co-catalyst support of the present invention can be manufactured by any conventional techniques. In an embodiment, the co-catalyst particles may further comprise one or more active metal components. In an embodiment, the support or base may contain catalytic metals, in particular metals from Group VIB of the Periodic Table, including molybdenum and/or tungsten, and/or from Group III of the periodic Table, in particular nickel and/or cobalt. Catalytic metals may be placed onto the support by conventional techniques, including comulling, impregnation and the like.

In an embodiment, the dispersant provided in Composition B may comprise one or more components for promoting the dispersion of the co-catalyst particles. In an embodiment, the dispersant may comprise, for example, a surface active material, such as a non-ionic, anionic, cationic, or amphoteric surfactant. In an embodiment, the dispersant may be added to the dispersant diluent in an amount such that Composition C may comprise from about 2 wt. % to 60 wt. % of the dispersant, or from about 4 wt. % to 40 wt. %, or from about 5 wt. % to 20 wt. %. In one embodiment, the dispersant may be in the liquid state over a broad temperature range, for example, from about 65° F. to 500° F., or from about 70° F. to 350° F.

In an embodiment, the dispersant may comprise a plurality of components. In an embodiment, the dispersant may comprise polyisobutylene succinimide. In an embodiment, the dispersant may further comprise a material selected from carboxylic acids, dicarboxylic acids, and combinations thereof. In one embodiment, the dispersant may comprise polyisobutylene succinimide and a carboxylic acid such as oleic acid. In an embodiment, Composition C may comprise from about 0.5 wt. % to 10.0 wt. % of polyisobutylene succinimide, or from about 1.0 wt. % to 7.5 wt. %, or from about 1.5 wt. % to 5.0 wt. % of polyisobutylene succinimide. In an embodiment, Composition C may further comprise from about 1.0 wt. % to 15.0 wt. % of oleic acid, or from about 2.0 wt. % to 10.0 wt. %, or from about 3.0 wt. % to 7.5 wt. % of oleic acid.

In an embodiment, the dispersant diluent may comprise oil. In an embodiment, oil comprising the dispersant diluent may have a boiling range from about 350° F. to 1125° F., or from about 550° F. to 1100° F., or from about 550° F. to 950° F. As a non-limiting example, the dispersant diluent may comprise a material selected from vacuum gas oil, light vacuum gas oil, heavy vacuum gas oil, lube oil base stock, heavy diesel, and combinations thereof.

In an embodiment, the liquid carrier may be miscible with the dispersant diluent to form a single phase homogeneous liquid, and Composition C may comprise a suspension of the co-catalyst particles dispersed in the homogeneous liquid. In an embodiment, the dispersant may promote dispersion of the co-catalyst particles in the homogeneous liquid. The dispersant may prevent or delay aggregation or flocculation of the co-catalyst particles in Composition C, and may prevent or delay sedimentation or settling of the co-catalyst particles. In an embodiment, the dispersant may also promote dispersion of the co-catalyst particles in a refinery stream or a hydrocarbon feed to a hydroprocessing unit.

While not being bound by any theory, in an embodiment a plurality of dispersant molecules may be adsorbed by, or otherwise associated with, each of the co-catalyst particles. In an embodiment, the dispersant molecules may each have an elongated or sterically bulky portion extending from the co-catalyst particles, thereby preventing direct contact between adjacent co-catalyst particles such that flocculation of the suspended co-catalyst particles does not occur.

In one embodiment, Composition C may comprise a slurry. In an embodiment, Composition C may have a viscosity, at about 70° F., in the range from about 100 centipoise to 3000 centipoise, in another embodiment from about 150 centipoise to 2000 centipoise, or in a further embodiment from about 200 centipoise to 1000 centipoise. In an embodiment, the solids (particulate) content of Composition C may be varied, for example, to optimize the catalytic activity thereof. In another embodiment, the viscosity of one or more of Compositions A, B, and C may be varied, for example, to facilitate production, transport, pumpability, and/or storage thereof.

In an embodiment, the viscosity of Composition C may be varied, for example, by selecting a more or less viscous liquid carrier, by selecting a more or less viscous dispersant diluent, by varying the solids content, or by a combination thereof. In an embodiment, the composition of Composition C may be adjusted to provide a co-catalyst composition that not only has good catalytic activity, but that is also convenient to transport, handle, and introduce into the hydroprocessing unit.

In an embodiment, Composition C may be injected into the hydroprocessing system directly. In another embodiment, Composition C may be combined with a catalyst introduction diluent to provide a Composition C/diluent mixture preparatory to the introduction of the co-catalyst particles into a hydroprocessing system. The Composition C/diluent mixture may be referred to herein as Composition D. In an embodiment, the dispersant may promote dispersion of the co-catalyst particles in the catalyst introduction diluent or Composition D. In another embodiment, the dispersant may promote dispersion of the co-catalyst particles in the hydrocarbon feed.

The catalyst introduction diluent may comprise, for example, petroleum derived oil. The catalyst introduction diluent may have a boiling range from about 350° F. to 1125° F., or from about 450° F. to 1100° F., or from about 650° F. to 1000° F. In an embodiment, the catalyst introduction diluent may comprise, for example, a refinery stream or a feedstock for a refinery process. Exemplary catalyst introduction diluents may include, without limitation, vacuum gas oil, light gas oil, diesel, light cycle oil, medium cycle oil, decant oil, flush oil, cutter stocks, and combinations thereof.

In an embodiment, Composition C may be miscible with the catalyst introduction diluent over a broad range of Composition C/diluent proportions to give a homogeneous liquid dispersion medium. In an embodiment, Composition C may be combined with the catalyst introduction diluent at a diluent/Composition C volume ratio in the range from about 1:1 to 200:1, or from about 2:1 to 100:1, or from about 3:1 to 50:1. In an embodiment, Composition C may be miscible with the catalyst introduction diluent over a broad temperature range. For example, Composition C may be miscible with the catalyst introduction diluent at a temperature in the range from about 150° F. to 700° F., or from about 200° F. to 500° F.

In an embodiment, the Composition C/diluent mixture may be contacted with a hydrocarbon feed to a hydroprocessing system for the efficacious dispersion of the co-catalyst composition into the hydrocarbon feed. In an embodiment, the hydrocarbon feed may comprise, for example, atmospheric or vacuum residuum or other heavy oil feed to a hydroprocessing unit. In an embodiment, the co-catalyst particles of Composition C may be sized for entrainment in the hydrocarbon stream through at least a portion of an ebullated bed hydroprocessing unit in one embodiment, or throughout the entire course of an ebullated bed hydroprocessing unit in another embodiment.

Methods for Making Co-Catalyst Compositions

In another embodiment we provide methods for making co-catalyst compositions. In an embodiment, a hydroprocessing co-catalyst composition, such as Composition C, may be prepared by a method comprising the steps of providing a Composition A, which comprises co-catalyst particles and a liquid carrier; and providing a Composition B, which comprises a dispersant and a dispersant diluent.

The co-catalyst particles may be in admixture with the liquid carrier in Composition A. In an embodiment, the co-catalyst particles may be combined with the liquid carrier using one or more techniques known in the art for mixing liquids with particulate solids. In an embodiment, Composition A may be prepared by combining the co-catalyst particles with the liquid carrier so as to form a suspension of the co-catalyst particles. In an embodiment, the liquid carrier may comprise oil. Such oil may comprise, for example, petroleum derived oil. In an embodiment, oil comprising the liquid carrier may have a boiling range from about 350° F. to 1125° F., or from about 550° F. to 1100° F., or from about 550° F. to 950° F. As a non-limiting example, the liquid carrier may comprise a material selected from vacuum gas oil, light vacuum gas oil, heavy vacuum gas oil, lube oil base stock, heavy diesel, and combinations thereof.

In an embodiment, the co-catalyst particles may be combined with the liquid carrier at a suitable temperature, which may be at, below, or above ambient temperature. In embodiments wherein the liquid carrier may comprise a viscous liquid, the co-catalyst particles may be combined with the liquid carrier at substantially above ambient temperature. In an embodiment, the co-catalyst particles may be combined with the liquid carrier at a temperature in the range from about 60° F. to 200° F., or from about 75° F. to 150° F.

In an embodiment, the co-catalyst particles may have a particle size in the range from about 1 micron (am) to 100 microns, or from about 2 microns to 60 microns, or from about 2 microns to 30 microns. In another embodiment, the co-catalyst particles may have a mean particle size between about 2 microns and 100 microns, or between about 4 microns and 40 microns, or between about 4 microns and 30 microns.

In an embodiment, the co-catalyst particles may be hydrophilic. The co-catalyst particles may comprise a support. The support may comprise a material selected from alumina, aluminosilicates, silica, as well as other refractory inorganic oxides, including boria, magnesia, titania, and the like, and combinations thereof. The co-catalyst support of the present invention can be manufactured by any conventional techniques. In an embodiment, the co-catalyst particles may further comprise one or more metal components. In an embodiment, the support or base may contain catalytic metals, in particular metals from Group VIB of the Periodic Table, including molybdenum and/or tungsten, and/or from Group VIII of the Periodic Table, in particular nickel and/or cobalt. Catalytic metals may be placed onto the support by conventional techniques, including comulling, impregnation, and the like.

In an embodiment, Composition B may be prepared by combining the dispersant and the dispersant diluent such that the dispersant may be in admixture with the dispersant diluent. In an embodiment, the dispersant may comprise, for example, a surface active material, such as a non-ionic, anionic, cationic, or amphoteric surfactant.

The dispersant may serve to promote dispersion of the co-catalyst particles of Composition A upon combining Composition A with Composition B. In an embodiment, the dispersant may be added to the dispersant diluent in an amount such that Composition B may comprise from about 10 wt. % to 95 wt. % of the dispersant, or from about 20 wt. % to 80 wt. %, or from about 30 wt. % to 70 wt. %. In one embodiment, the dispersant may be in the liquid state over a broad temperature range, for example, from about 65° F. to 500° F., or from about 70° F. to 350° F.

In an embodiment, the dispersant may comprise a plurality of components. In an embodiment, the dispersant may comprise polyisobutylene succinimide. In an embodiment, the dispersant may comprise a material selected from carboxylic acids, dicarboxylic acids, and combinations thereof. In one embodiment, the dispersant may comprise polyisobutylene succinimide and a carboxylic acid such as oleic acid. In a sub-embodiment, Composition B may comprise from about 10 wt. % to 30 wt. % of polyisobutylene succinimide and from about 30 wt. % to 65 wt. % of oleic acid.

In an embodiment, oil comprising the dispersant diluent may have a boiling range from about 350° F. to 1125° F., or from about 550° F. to 1100° F., or from about 550° F. to 950° F. As a non-limiting example, the dispersant diluent may comprise a material selected from vacuum gas oil, light vacuum gas oil, heavy vacuum gas oil, lube oil base stock, heavy diesel, and combinations thereof.

In an embodiment, Composition A and Composition B may be provided, e.g., to a hydroprocessing unit or other refinery location, in separate vessels or containers. That is to say, in an embodiment, Composition C may be provided, e.g., to a hydroprocessing unit, as its component parts, Composition A and Composition B. In another embodiment, a method of making a hydroprocessing co-catalyst composition may further comprise combining Composition A with Composition B to provide Composition C.

Composition C may comprise a suspension of the co-catalyst particles dispersed in a mixture of the liquid carrier and the dispersant diluent. Such mixture may comprise a homogeneous liquid over a broad temperature range, e.g., from about 65° F. to 650° F., under hydroprocessing conditions (high pressure). In an embodiment, Composition A may be combined with Composition B at a Composition A/Composition B volume ratio in the range from about 1:20 to 60:1, or from about 1:10 to 50:1, or from about 1:5 to 45:1, to provide Composition C.

In an embodiment, the co-catalyst particles may be prepared, e.g., by grinding, milling, and the like. The co-catalyst particles may be sorted to provide suitable size distributions for preparing a co-catalyst composition having an appropriate level of catalytic activity, a suitable viscosity, and/or other characteristics for a particular hydroprocessing process or application. In an embodiment, the co-catalyst particles may be ground, pulverized, or crushed to the desired particle size using techniques known in the art, e.g., via wet grinding or dry grinding, and using equipment known in the art, including but not limited to: hammer mill, roller mill, ball mill, jet mill, attrition mill, grinding mill, media agitation mill, and the like. In an embodiment, the co-catalyst particles may be synthesized to the desired size distributions utilizing forming techniques known in the art, including but not limited to precipitation, gelling, atomization, and the like.

In an embodiment, the co-catalyst particles may be synthesized, ground or milled to achieve co-catalyst particles having a particle size in the range from about 1 micron ($\mu m$) to 100 microns, or from about 2 microns to 60 microns, or from about 2 microns to 30 microns. In another embodiment, the co-catalyst particles may have a mean particle size between about 2 microns and 100 microns, or between about 4 microns and 40 microns, or between about 4 microns and 30 microns.

In an embodiment, the dispersant may comprise a plurality of components. In an embodiment, the dispersant may comprise polyisobutylene succinimide. In an embodiment, the dispersant may further comprise a material selected from carboxylic acids, dicarboxylic acids, and combinations thereof. In one embodiment, the dispersant may comprise polyisobutylene succinimide and a carboxylic acid such as oleic acid. In a sub-embodiment, Composition B may comprise from about 10 wt. % to 30 wt. % of polyisobutylene succinimide and from about 30 wt. % to 65 wt. % of oleic acid.

In an embodiment, an amount of the dispersant to be used in preparing the hydroprocessing co-catalyst composition (e.g., Composition C) may be varied, for example, according to the total surface area of the co-catalyst particles. In one embodiment, the amount of dispersant in the hydroprocessing co-catalyst composition may be proportional to the amount of co-catalyst particles in the hydroprocessing co-catalyst composition. In an embodiment, Composition C may comprise from about 2 wt. % to 60 wt. % of the dispersant, or from about 4 wt. % to 40 wt. %, or from about 5 wt. % to 20 wt. %.

In an embodiment, the dispersant may be combined with the dispersant diluent at a suitable temperature, which may be at, below, or above ambient temperature. In embodiments wherein the dispersant diluent may comprise a viscous liquid, the dispersant may be combined with the dispersant diluent at substantially above ambient temperature, e.g., at a temperature in the range about 60° F. to 200° F., or from about 75° F. to 150° F.

In an embodiment, each of Composition A and Composition B may be physically and chemically stable, and each of Composition A and Composition B can be transported, moved, and manipulated, for example, by pumping, either separately or following the combining of Compositions A and B to form Composition C.

In another embodiment, Composition C may be prepared by separately combining one or more dispersant components with Composition A. As an example, one or more materials selected from polyisobutylene succinimide, carboxylic acids, and dicarboxylic acids, may be added separately to Composition A.

In another embodiment, the method of preparing a hydroprocessing co-catalyst composition may further include combining Composition C with a catalyst introduction diluent to provide a Composition D, wherein Composition D may comprise a diluted suspension of the co-catalyst particles. In an embodiment, the catalyst introduction diluent may be miscible with the liquid carrier and with the dispersant diluent. The catalyst introduction diluent may be further miscible with a hydrocarbon feed having a boiling range up to at least about 650° F. The dispersant of the co-catalyst composition may promote dispersion of the co-catalyst particles in at least one material selected from the liquid carrier, the dispersant diluent, the catalyst introduction diluent, the hydrocarbon feed, and combinations thereof.

In an embodiment, the catalyst introduction diluent may comprise a hydrocarbonaceous oil. The catalyst introduction diluent may comprise, for example, petroleum derived oil. The catalyst introduction diluent may have a boiling range from about 350° F. to 1125° F., or from about 450° F. to 1100° F., or from about 650° F. to 1000° F. In an embodiment, the catalyst introduction diluent may comprise, for example, a refinery stream or a feedstock for a refinery process. Exemplary catalyst introduction diluents may include, without limitation, vacuum gas oil, light gas oil, diesel, light cycle oil, medium cycle oil, decant oil, flush oil, cutter stocks, and combinations thereof.

In an embodiment, the catalyst introduction diluent may be present in Composition D in an amount between about 50 vol. % and 99 vol. %, or between about 67 vol. % and 98 vol. %, or between about 75 vol. % and 95 vol. %. In one embodiment, Composition C may be combined with the catalyst introduction diluent at a diluent/Composition C volume ratio in the range from about 1:1 to 100:1, or from about 2:1 to 50:1, or from about 3:1 to 20:1.

Methods for Introducing a Co-Catalyst Composition into a Hydroprocessing System

In another embodiment, we provide a method of introducing co-catalyst particles into a hydroprocessing system. The method may include providing a Composition A comprising the co-catalyst particles and a liquid carrier. In an embodiment, the co-catalyst particles may be suspended in the liquid carrier. The co-catalyst particles may be in the micron size range. In an embodiment, the co-catalyst particles may have a particle size in the range from about 1 micron ($\mu$m) to 100 microns, or from about 2 microns to 60 microns, or from about 2 microns to 30 microns. In another embodiment, the co-catalyst particles may have a mean particle size between about 2 microns and 100 microns, or between about 4 microns and 40 microns, or between about 4 microns and 30 microns.

In an embodiment, Composition A may comprise from about 5 wt. % to 50 wt. % of the co-catalyst particles, in another embodiment from about 10 wt. % to 40 wt. %, or in a further embodiment from about 15 wt. % to 30 wt. %. In an embodiment, Composition A may comprise from about 50 wt. % to 95 wt. % of the liquid carrier, or from about 60 wt. % to 90 wt. %, or from about 70 wt. % to 85 wt. %.

In an embodiment, the liquid carrier may comprise oil. Such oil may comprise, for example, petroleum derived oil. In an embodiment, oil comprising the liquid carrier may have a boiling range from about 350° F. to 1125° F., or from about 550° F. to 1100° F., or from about 550° F. to 950° F. As a non-limiting example, the liquid carrier may comprise a material selected from vacuum gas oil, light vacuum gas oil, heavy vacuum gas oil, lube oil base stock, heavy diesel, and combinations thereof.

In an embodiment, the liquid carrier may be miscible with a liquid hydrocarbonaceous oil, such as that comprising a catalyst introduction diluent or a hydrocarbon feed to a hydroprocessing system. In an embodiment, the liquid carrier may be miscible with the liquid hydrocarbonaceous oil over a broad temperature range. For example, the liquid carrier may be miscible with the liquid hydrocarbonaceous oil at a temperature in the range from about 150° F. to 700° F., or from about 350° F. to 650° F., under hydroprocessing conditions (high pressure).

In an embodiment, the catalyst introduction diluent may comprise a hydrocarbonaceous oil. The catalyst introduction diluent may comprise, for example, petroleum derived oil. The catalyst introduction diluent may have a boiling range from about 350° F. to 1125° F., or from about 450° F. to 1100° F., or from about 650° F. to 1000° F. In an embodiment, the catalyst introduction diluent may comprise, for example, a refinery stream or a feedstock for a refinery process. Exemplary catalyst introduction diluents may include, without limitation, vacuum gas oil, light gas oil, diesel, light cycle oil, medium cycle oil, decant oil, flush oil, cutter stocks, and combinations thereof.

The method of introducing co-catalyst particles into a hydroprocessing system may further include providing a Composition B comprising a dispersant and a dispersant diluent. Composition B may comprise from about 10 wt. % to 95 wt. % of the dispersant, or from about 20 wt. % to 80 wt. %, or from about 30 wt. % to 70 wt. %.

In an embodiment, the dispersant may comprise a plurality of components. In one embodiment, the dispersant may comprise a polyisobutylene succinimide. In an embodiment, the dispersant may further comprise a material selected from carboxylic acids, dicarboxylic acids, and combinations thereof. In an embodiment, the dispersant may comprise polyisobutylene succinimide and a carboxylic acid such as oleic acid. In a sub-embodiment, Composition B may comprise from about 5 wt. % to 40 wt. %, or from about 10 wt. % to 30 wt. %, of polyisobutylene succinimide; and Composition B may further comprise from about from about 5 wt. % to 70 wt. %, or from about 30 wt. % to 65 wt. %, of oleic acid.

In an embodiment, the dispersant diluent may comprise oil. Such oil may comprise, for example, petroleum derived oil. In an embodiment, oil comprising the dispersant diluent may have a boiling range from about 350° F. to 1125° F., or from about 550° F. to 1100° F., or from about 550° F. to 950° F. As a non-limiting example, the dispersant diluent may comprise a material selected from vacuum gas oil, light vacuum gas oil, heavy vacuum gas oil, lube oil base stock, heavy diesel, and combinations thereof.

In an embodiment, the method of introducing co-catalyst particles into a hydroprocessing system may still further include combining Composition A with Composition B to form a Composition C, wherein Composition C may comprise a suspension of the co-catalyst particles. In an embodiment, Composition C may be agitated to maintain the co-catalyst particles in suspension until Composition C is to be used, e.g., diluted for introduction of the co-catalyst particles into the hydroprocessing system. In an embodiment, the combining step may comprise combining Composition A with Composition B at a Composition A/Composition B volume ratio in the range from about 1:20 to 60:1, or from about 1:10 to 50:1, or from about 1:5 to 45:1.

In another embodiment, Composition C may be prepared by separately combining one or more dispersant components with Composition A. As an example, one or more materials selected from polyisobutylene succinimide, carboxylic acids, and dicarboxylic acids, may be added separately to Composition A.

The method of introducing the co-catalyst particles into a hydroprocessing system may yet further include, after the formation of Composition C, contacting the co-catalyst particles with a hydrocarbon feed of the hydroprocessing system.

In another embodiment, prior to contacting the co-catalyst particles with the hydrocarbon feed, the method may further comprise diluting Composition C with the catalyst introduction diluent to provide a Composition D comprising a diluted suspension of the co-catalyst particles. In an embodiment, Composition D may be suitable for introduction, e.g., via injection, into a hydrocarbon feed to a hydroprocessing system. In an embodiment, the contacting step may comprise contacting Composition D with the hydrocarbon feed such that the co-catalyst particles are entrained with the hydrocarbon feed within the hydroprocessing system.

Composition D could join the hydrocarbon feed at various locations within the hydroprocessing unit. This could include injecting Composition D directly into the hydrocarbon feed line, ensuring that provisions were made to ensure that Composition D will undergo sufficient mixing at the injection point to fully disperse into the hydrocarbon feed, utilizing slurry flow principles known in the art, including but not limited to proper line sizing, geometry and orientation, utilization of a quill, static mixer, or the like.

The catalyst introduction diluent may be in the liquid state when combined with Composition C. In an embodiment, the catalyst introduction diluent may be miscible with each of the liquid carrier, the dispersant diluent, and the hydrocarbon feed to the hydroprocessing system, and combinations thereof. The catalyst introduction diluent may comprise, for example, petroleum derived oil. The catalyst introduction diluent may have a boiling range from about 350° F. to 1125° F., or from about 450° F. to 1100° F., or from about 650° F. to 1000° F. In an embodiment, the catalyst introduction diluent may comprise, for example, a refinery stream or a feedstock for a refinery process. Exemplary catalyst introduction diluents may include, without limitation, vacuum gas oil, light gas oil, diesel, light cycle oil, medium cycle oil, decant oil, flush oil, cutter stocks, and combinations thereof.

In an embodiment, the catalyst introduction diluent may be present in Composition D in an amount between about 50 vol. % and 99 vol. %, or between about 67 vol. % and 98 vol. %, or between about 75 vol. % and 95 vol. %. For example, in one embodiment, Composition C may be combined with the catalyst introduction diluent at a diluent/Composition C volume ratio in the range from about 1:1 to 100:1, or from about 2:1 to 50:1, or from about 3:1 to 20:1.

During the step of diluting Composition C with the catalyst introduction diluent, the catalyst introduction diluent may be at a temperature in the range from about ambient temperature to 700° F., or from about 350° F. to 650° F., or from about 450° F. to 600° F. In an embodiment, Composition C may be maintained at about ambient temperature, prior to combining the co-catalyst composition with the catalyst introduction diluent. In another embodiment, Composition C may be preheated prior to combining the co-catalyst composition with the catalyst introduction diluent. During the contacting step, the hydrocarbon feed may be at a temperature in the range from about 350° F. to 750° F., or from about 350° F. to 650° F., or from about 450° F. to 600° F. In an embodiment, the hydrocarbon feed may comprise heavy oil, such as vacuum residuum or atmospheric residuum, having a boiling range up to at least about 650° F.

The dispersant may promote dispersion of the co-catalyst particles in at least one of the liquid carrier, the dispersant diluent, the catalyst introduction diluent, the hydrocarbon feed, or combinations thereof. In an embodiment, the dispersant may comprise polyisobutylene succinimide. In an embodiment, the dispersant may further comprise a material selected from carboxylic acids, dicarboxylic acids, and combinations thereof. In an embodiment, the dispersant may comprise polyisobutylene succinimide and oleic acid. In an embodiment, Composition C may comprise from about 0.5 wt. % to 10.0 wt. % of polyisobutylene succinimide, or from about 1.0 wt. % to 7.5 wt. %, or from about 1.5 wt. % to 5.0 wt. % of polyisobutylene succinimide. In an embodiment, Composition C may further comprise from about 1.0 wt. % to 15.0 wt. % of oleic acid, or from about 2.0 wt. % to 10.0 wt. %, or from about 3.0 wt. % to 7.5 wt. % of oleic acid.

In another embodiment, a method of introducing co-catalyst particles into a hydroprocessing system may include providing a Composition A comprising the co-catalyst particles and a liquid carrier. Composition A may comprise from about 5 wt. % to 50 wt. % of the co-catalyst particles and from about 50 wt. % to 95 wt. % of the liquid carrier. In an embodiment, the liquid carrier may comprise oil. Such oil may comprise, for example, petroleum derived oil. In an embodiment, oil comprising the liquid carrier may have a boiling range from about 350° F. to 1125° F., or from about 550° F. to 1100° F., or from about 550° F. to 950° F. As a non-limiting example, the liquid carrier may comprise a material selected from vacuum gas oil, light vacuum gas oil, heavy vacuum gas oil, lube oil base stock, heavy diesel, and combinations thereof.

In an embodiment, the co-catalyst particles may have a particle size in the range from about 1 micron (µm) to 100 microns, or from about 2 microns to 60 microns, or from about 2 microns to 30 microns. In another embodiment, the co-catalyst particles may have a mean particle size between about 2 microns and 100 microns, or between about 4 microns and 40 microns, or between about 4 microns and 30 microns.

The co-catalyst particles may comprise a support. The support may comprise a material selected from alumina, aluminosilicates, silica, as well as other refractory inorganic oxides, including boria, magnesia, titania, and the like, and combinations thereof. The co-catalyst support of the present invention can be manufactured by any conventional techniques. In an embodiment, the co-catalyst particles may further comprise one or more metal components. In an embodiment, the support or base may contain catalytic metals, in particular metals from Group VIB of the Periodic Table, including molybdenum and/or tungsten, and/or from Group III of the periodic Table, in particular nickel and/or cobalt. Catalytic metals may be placed onto the support by conventional techniques, including comulling, impregnation, and the like.

The method of introducing co-catalyst particles into a hydroprocessing system may further include providing a Composition B comprising a dispersant and a dispersant diluent. In an embodiment, the dispersant may comprise polyisobutylene succinimide. In an embodiment, the dispersant may further comprise a material selected from carboxylic acids, dicarboxylic acids, and combinations thereof.

In an embodiment, the dispersant diluent may comprise oil. In an embodiment, oil comprising the dispersant diluent may have a boiling range from about 350° F. to 1125° F., or from about 550° F. to 1100° F., or from about 550° F. to 950° F. As a non-limiting example, the dispersant diluent may comprise a material selected from vacuum gas oil, light vacuum gas oil, heavy vacuum gas oil, lube oil base stock, heavy diesel, and combinations thereof.

The method of introducing co-catalyst particles into a hydroprocessing system may further include combining Composition A with Composition B to form a Composition C, and combining Composition C with a catalyst introduction diluent to provide a composition D. The catalyst introduction diluent may be miscible with Composition C. In an embodiment, the catalyst introduction diluent may comprise oil.

The method of introducing co-catalyst particles into a hydroprocessing system may still further include contacting composition D with the hydrocarbon feed of the hydroprocessing system. Composition D may be miscible with the hydrocarbon feed. In an embodiment, Composition D may be combined with the hydrocarbon feed such that the co-catalyst particles are entrained with the hydrocarbon feed within the hydroprocessing system.

In yet another embodiment, a method of introducing co-catalyst particles into a hydroprocessing system may include providing a Composition A comprising the co-catalyst particles and a liquid carrier. The co-catalyst particles may comprise a support comprising a material selected from alumina, aluminosilicates, silica, boria, magnesia, titania, and combinations thereof, and the co-catalyst particles may have a mean particle size between about 2 microns and 100 microns.

The method of introducing co-catalyst particles into a hydroprocessing system may further include providing a Composition B comprising a dispersant and a dispersant diluent. In an embodiment, the dispersant may comprise polyisobutylene succinimide. In an embodiment, the dispersant may further comprise a material selected from carboxylic acids, dicarboxylic acids, and combinations thereof. In one embodiment, the dispersant may comprise polyisobutylene succinimide and a carboxylic acid such as oleic acid.

In an embodiment, the dispersant diluent may comprise oil. In an embodiment, oil comprising the dispersant diluent may have a boiling range from about 350° F. to 1125° F., or from about 550° F. to 1100° F., or from about 550° F. to 950° F. As a non-limiting example, the dispersant diluent may comprise a material selected from vacuum gas oil, light vacuum gas oil, heavy vacuum gas oil, lube oil base stock, heavy diesel, and combinations thereof.

The method of introducing co-catalyst particles into a hydroprocessing system may still further include combining Composition A with Composition B to form a Composition C, wherein Composition C comprises a suspension of the co-catalyst particles. The method may yet further include diluting Composition C with a catalyst introduction diluent to provide a composition D comprising a diluted suspension of the co-catalyst particles, or direct injection of Composition C into the hydroprocessing unit. The catalyst introduction diluent may comprise oil, and the catalyst introduction diluent may be miscible with Composition C.

After the diluting step, Composition D may be contacted with a hydrocarbon feed of the hydroprocessing system, wherein Composition D may be miscible with the hydrocarbon feed. The hydrocarbon feed may have a boiling range >650° F. and/or >950° F. In an embodiment, the contacting step may comprise contacting the co-catalyst particles with the hydrocarbon feed such that the co-catalyst particles are entrained with the hydrocarbon feed within the hydroprocessing system.

According to methods and compositions disclosed herein, co-catalyst particles introduced into a hydroprocessing system may be present in the hydrocarbon feed at a concentration up to about 600 ppm, or from about 20 ppm to 500 ppm, or from about 100 to 400 ppm. In an embodiment, the co-catalyst particles may be entrained with the hydrocarbon feed so as to freely migrate with the hydrocarbon feed through at least a portion of the hydroprocessing system, and in another embodiment the co-catalyst particles may be entrained with the hydrocarbon feed so as to freely migrate with the hydrocarbon feed throughout the entire hydroprocessing system.

The hydrocarbon feed may be in the liquid state when contacted with the co-catalyst particles. In an embodiment, when the hydrocarbon feed is contacted with the co-catalyst particles during the contacting step, the hydrocarbon feed may be at a temperature in the range from about 350° F. to 750° F., or from about 350° F. to 650° F., or from about 450° F. to 600° F. In an embodiment, and as a non-limiting example, the hydrocarbon feed may comprise heavy oil having a boiling range up to at least about 650° F.

In one embodiment, fresh co-catalyst, e.g., in the form of a Composition C/catalyst introduction diluent mixture, may be added to the hydroprocessing system as a single addition; or in another embodiment, the fresh co-catalyst may be added to the hydroprocessing system intermittently; while in a further embodiment, the fresh co-catalyst may be added to the hydroprocessing system continuously.

In other embodiments fresh co-catalyst, e.g., in the form of a Composition C only, may be added directly to the hydroprocessing system in the absence of a catalyst introduction diluent, either as a single addition, intermittently, or continuously.

During hydroprocessing, the dispersant may eventually decompose to yield only species that are entirely compatible with the hydroprocessing process and that will not interfere with the products of hydroprocessing. In an embodiment, at least substantially all of the dispersant may be converted or decomposed, under hydroprocessing conditions in the hydroprocessing system, to yield light hydrocarbons, for example, predominantly $C_1$-$C_4$ hydrocarbons.

EXAMPLES

The following illustrative examples are intended to be non-limiting.

Example 1

Preparation of a Suspension of Co-Catalyst Particles Using Vacuum Gas Oil as Liquid Carrier 43 g of co-catalyst particles were combined with 100 g of vacuum gas oil (VGO) (see Table 1). The mixture was agitated for 5 minutes using a spatula to provide a co-catalyst composition in the form of a slurry comprising a suspension of the co-catalyst particles in the VGO. The co-catalyst solids content of the co-catalyst composition of Example 1 was about 30 wt. %.

Example 2

Preparation of a Suspension of Co-Catalyst Particles Using Vacuum Gas Oil as Liquid Carrier and Dispersants 43 g of co-catalyst particles (per Example 1) were combined with 100 g of VGO (see Table 1), 2.2 g of polyisobutylene succinimide, and 5.4 g of oleic acid. The mixture was agitated for 5 minutes using a spatula to provide a co-catalyst composition in the form of a slurry comprising a suspension of the co-catalyst particles in the VGO and dispersants. The co-catalyst solids content of the co-catalyst composition of Example 2 was about 28.6 wt. %. The addition of dispersants in Example 2 led to improved solids dispersion (see Table 2), as measured using a Mettler-Toledo Focused Beam Reflectance Measurement (FBRM) probe, relative to Example 1.

Example 3

Preparation of a Co-Catalyst Containing Material Using Medium Cycle Oil and Dispersants 43 g of co-catalyst particles (per Example 1) were combined with 100 g of medium cycle oil (MCO) (see Table 1), 2.2 g of polyisobutylene succinimide, and 5.4 g of oleic acid. The mixture was agitated as for Example 1. The use of MCO in the protocol of Example 3, led to poor co-catalyst solids dispersion (see Table 2), even in the presence of dispersants.

TABLE 1

| | Feed Description | |
|---|---|---|
| Feed ID | MCO ABQ0688 | VGO ABQ0297 |
| Feed API | 10.7 | 20.9 |
| Feed Sulfur, wt % | 0.3980 | 2.2130 |
| Feed Nitrogen, ppm | 640 | 1247 |
| Distillation wt % | °F. | °F. |
| 0.5 | 403 | 567 |
| 5 | 480 | 694 |
| 10 | 490 | 741 |
| 15 | 499 | 770 |
| 20 | 517 | 788 |
| 25 | 524 | 802 |
| 30 | 532 | 814 |
| 40 | 546 | 832 |
| 50 | 568 | 849 |
| 60 | 583 | 865 |
| 70 | 606 | 882 |
| 75 | 620 | 892 |
| 80 | 630 | 903 |
| 85 | 651 | 917 |
| 90 | 669 | 934 |
| 95 | 699 | 961 |
| 99 | 762 | 1003 |
| 99.5 | 787 | 1014 |
| 650° F.− | 84.8 | 2.1 |
| 650-950° F. | 15.2 | 91.2 |
| 950° F.+ | 0.0 | 6.7 |

TABLE 2

| | Example 1 | Example 2 | Example 3 |
|---|---|---|---|
| Co-Catalyst Solids, g | 43 | 43 | 43 |
| Oil Carrier Type | VGO | VGO | MCO |
| Oil Carrier, g | 100 | 100 | 100 |
| Dispersant polyisobutylene succinimide, g | 0 | 2.2 | 2.2 |
| Dispersant Oleic Acid, g | 0 | 5.4 | 5.4 |
| Solids Concentration, wt. % | 30.1 | 28.6 | 28.6 |
| Particle Size Distribution | | | |
| 0-10 μm (% Count) | 91.9 | 96.0 | 80.7 |
| 10-20 μm (% Count) | 6.2 | 3.5 | 9.0 |
| >20 μm (% Count) | 1.9 | 0.5 | 10.3 |

Where permitted, all publications, patents and patent applications cited in this application are herein incorporated by reference in their entirety, to the extent such disclosure is not inconsistent with embodiments of the present invention.

For the purposes of this specification and appended claims, unless otherwise indicated, all numbers expressing quantities, percentages or proportions, and other numerical values used herein are to be understood as being modified in all instances by the term "about." It is noted that, as used in this specification and the appended claims, the singular forms "a," "an," and "the," include plural references unless expressly and unequivocally limited to one referent.

Unless otherwise specified, the recitation of a genus of elements, materials or other components, from which an individual component or mixture of components can be selected, is intended to include all possible sub-generic combinations of the listed components and mixtures thereof. Also, "include" and its variants are intended to be non-limiting, such that recitation of items in a list is not to the exclusion of other like items that may also be useful in the materials, compositions and methods disclosed herein.

Numerous variations of the disclosed compositions and methods may be possible in light of the teachings herein. It is therefore understood that within the scope of the following claims, embodiments of the invention may be practiced otherwise than as specifically described or exemplified herein.

What is claimed is:

1. A hydro-processing co-catalyst composition, consisting essentially of:
    a liquid carrier comprising oil; and
    co-catalyst particles in admixture with the liquid carrier comprising oil, wherein:
    the co-catalyst particles are hydrophilic, and
    the co-catalyst particles have a mean particle size between about 2 microns and 100 microns;
    the liquid carrier comprising oil has a boiling point ranging from about 350° F. to 1125° F.,
    the co-catalyst particles are suspensible in the liquid carrier, and the co-catalyst composition comprises from about 5 wt. % to 50 wt. % of the co-catalyst particles and from about 50 wt. % to 95 wt. % of the liquid carrier comprising oil.

2. The composition of claim 1, wherein the co-catalyst particles have a mean particle size between about 4 microns and 40 microns.

3. The composition of claim 2, wherein the co-catalyst particles comprise alumina.

4. The composition of claim 1, wherein the co-catalyst particles comprise a support comprising a material selected from the group consisting of alumina, aluminosilicates, silica, boria, magnesia, titania, and combinations thereof.

5. The composition of claim 1, wherein the liquid carrier comprising oil is selected from the group consisting of vacuum gas oil, light vacuum gas oil, heavy vacuum gas oil, lube oil base stock, heavy diesel oil, and combinations thereof.

6. The composition of claim 1, wherein the composition has a viscosity in the range from about 1000 centipoise to 5000 centipoise at a temperature of about 70° F.

7. A hydro-processing co-catalyst composition, consisting essentially of:
    co-catalyst particles having a mean particle size between about 2 microns and 100 microns admixed in a liquid carrier comprising oil;
    the composition comprises 5 to 50 wt. % of the co-catalyst particles,
    the co-catalyst particles are suspensible in the liquid carrier,
    the liquid carrier comprising oil is selected from the group consisting of vacuum gas oil, light vacuum gas oil, heavy vacuum gas oil, lube oil base stock, heavy diesel oil, and combinations thereof, and
    the liquid carrier comprising oil has a boiling point ranging from about 350° F. to 1125° F.

8. The composition of claim 7, comprising from about 50 wt. % to 95 wt. % of the liquid carrier.

9. The composition of claim 7, wherein the co-catalyst particles comprise a support comprising a material selected from the group consisting of alumina, aluminosilicates, silica, boria, magnesia, titania, and combinations thereof.

10. The composition of claim 7, wherein:
    the co-catalyst particles are hydrophilic.

11. A hydroprocessing co-catalyst composition, consisting essentially of:
    a liquid carrier comprising oil having a boiling range from about 350° F. to 1125° F.; and
    co-catalyst particles having a mean particle size between about 4 microns and 40 microns, wherein:
    the composition comprises from about 5 wt. % to 50 wt. % of the co-catalyst particles, the co-catalyst particles comprise a support comprising a material selected from the group consisting of alumina, aluminosilicates, silica, boria, magnesia, titania, and combinations thereof, the co-catalyst particles are suspensible in the liquid carrier, and the liquid carrier comprising oil is selected from the group consisting of vacuum gas oil, light vacuum gas oil, heavy vacuum gas oil, lube oil base stock, heavy diesel oil, and combinations thereof.

12. The composition of claim 11, wherein the co-catalyst particles further comprise at least one metal component selected from molybdenum, tungsten, nickel, cobalt, and combinations thereof.

13. The composition of claim 11, wherein the support comprises alumina.

14. The composition of claim 11, comprising from about 50 wt. % to 95 wt. % of the liquid carrier.

15. The composition of claim 11, wherein the co-catalyst particles are hydrophilic.

* * * * *